United States Patent
Augenstein et al.

(10) Patent No.: US 11,867,805 B2
(45) Date of Patent: *Jan. 9, 2024

(54) 1D ULTRASONIC TRANSDUCER UNIT FOR AREA MONITORING

(71) Applicant: Pepperl + Fuchs SE, Mannheim (DE)

(72) Inventors: Regine Augenstein, Mannheim (DE); Thomas Kaindl, Dossenheim (DE)

(73) Assignee: Pepperl + Fuchs SE, Mannheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,073

(22) Filed: Feb. 3, 2021

(65) Prior Publication Data

US 2021/0156994 A1    May 27, 2021

Related U.S. Application Data

(63) Continuation of application No. PCT/EP2019/000164, filed on May 23, 2019.

(30) Foreign Application Priority Data

Aug. 3, 2018  (DE) .................. 10 2018 006 139.7

(51) Int. Cl.
  *G01S 15/88* (2006.01)
  *G01S 7/521* (2006.01)
  (Continued)

(52) U.S. Cl.
  CPC ............... *G01S 15/88* (2013.01); *G01S 5/02* (2013.01); *G01S 7/521* (2013.01); *G01S 7/54* (2013.01)

(58) Field of Classification Search
  None
  See application file for complete search history.

(56) References Cited

U.S. PATENT DOCUMENTS 4,803,670 A * 2/1989 Chen ..................... G01S 7/521
                                                                340/904
6,310,831 B1 * 10/2001 Dillman ............... G10K 11/346
                                                                367/103
(Continued)

FOREIGN PATENT DOCUMENTS

DE      19809206 A1    9/1999
EP      0928640 A1    7/1999
(Continued)

OTHER PUBLICATIONS

IP Rating Chart, "https://web.archive.org/web/20170718220414/http://www.dsmt.com/resources/ip-rating-chart/" (Year: 2017).*

(Continued)

*Primary Examiner* — Isam A Alsomiri
*Assistant Examiner* — Vikas Atmakuri
(74) *Attorney, Agent, or Firm* — Muncy, Geissler, Olds & Lowe , P.C.

(57) ABSTRACT

A 1D ultrasonic transducer unit for area monitoring, having a housing having a securing device for securing to a surface and having at least three discrete ultrasonic transducers designed to decouple sound waves with a consistent operating frequency between 20 kHz and 400 kHz in a gaseous medium, and a control unit designed to control each ultrasonic transducer individually, wherein two ultrasonic transducers, directly adjacent to one another, are spaced apart by a distance, the 1D ultrasonic transducer unit has a sound channel per ultrasonic transducer with an input opening, associated with exactly one respective ultrasonic transducer, and an output opening, the output openings are arranged along a straight line, a distance from the directly adjacent output opening corresponds at most to the full or half the wavelength in the gaseous medium and is smaller than the corresponding distance.

14 Claims, 3 Drawing Sheets

(51) Int. Cl.
*G01S 7/54* (2006.01)
*G01S 5/02* (2010.01)

(56) References Cited

U.S. PATENT DOCUMENTS

| | | | |
|---|---|---|---|
| 8,973,442 B2 | 3/2015 | Schneider et al. | |
| 2005/0184859 A1* | 8/2005 | Li | B60Q 9/006 |
| | | | 340/435 |
| 2011/0163872 A1 | 7/2011 | Pasveer et al. | |
| 2012/0108975 A1* | 5/2012 | Marteau | G01S 15/8909 |
| | | | 600/447 |
| 2013/0283918 A1* | 10/2013 | Habermehl | G01N 29/262 |
| | | | 73/622 |
| 2014/0283611 A1* | 9/2014 | Habermehl | G10K 11/346 |
| | | | 73/602 |
| 2015/0011884 A1* | 1/2015 | Walker | A61B 5/418 |
| | | | 600/447 |
| 2015/0041248 A1* | 2/2015 | Ichihashi | F02C 7/24 |
| | | | 29/896.2 |
| 2019/0281383 A1* | 9/2019 | Shigihara | G10K 11/025 |
| 2022/0163324 A1 | 5/2022 | Augenstein et al. | |

FOREIGN PATENT DOCUMENTS

| | | | | |
|---|---|---|---|---|
| EP | 0940801 | A2 | 9/1999 | |
| EP | 2922050 | A1 * | 9/2015 | G10K 11/22 |
| JP | H03-039187 | U | 4/1991 | |
| JP | H10224880 | A | 8/1998 | |
| JP | 2000098030 | A | 4/2000 | |
| JP | 2007064740 | A | 3/2007 | |
| JP | 2012502270 | A | 1/2012 | |
| JP | 2013511733 | A | 4/2013 | |
| JP | 2021532692 | A | 11/2021 | |
| WO | WO2008/135004 | A1 | 11/2008 | |

OTHER PUBLICATIONS

Air-Speed of sound vs Temperature, The Engineering Toolbox, (Year: 2018).*
Murata Manufacturing: "Untrasonic Sensor Application Manual Cat. No. S15E-5," Internet, Jan. 1, 2009, URL: https://cdn-reichelt.de/documents/datenblatt/B400/ULTRASCHALL%20SENSOR.pdf, XP055620003.
International Search Report dated Sep. 23, 2019 in corresponding application PCT/EP2019/000164.
Takayuki Takahashi et al: "Ultrasonic phased array sensor for electric travel aids for visually impaired people" Proceedings of the SPIE—The International Society for Optical Engineering SPIE—Vertical-Cavity Surface-Emitting Lasers XIII, SPIE Opto: Integrated Optoelectronic Devices, Jan. 24-29, 2009, San Jose, California, United States, vol. 6794, Dec. 3, 2007, p. 67943V, DOI: 10.1117/12.783988, ISSN: 0277-786X, XP055619716.
Konetzke, Eric et al: "Phased Array Transducer for Emitting 40-KHz air-coupled ultrasound without grating lobes" 2015 IEEE International Ultrasonics Symposium, IEEE, Oct. 21, 2015, pp. 1-4, DOI: 10.1109/ULTSYM.2015.0019, XP032799399.
Jaeger, Axel et al: "Air-coupled 40-kHz ultrasonic 2D-phased array based on a 3D-printed waveguide structure" 2017 IEEE International Ultrasonics Symposium, IEEE, Sep. 6, 2017, pp. 1-4, DOI: 10.1109/ULTSYM.2017.8091892, XP033245009.
Japanese Office Action dated Apr. 4, 2022 in corresponding application 2021-505928.

* cited by examiner

US 11,867,805 B2

1D ULTRASONIC TRANSDUCER UNIT FOR AREA MONITORING

This nonprovisional application is a continuation of International Application No. PCT/EP2019/000164, which was filed on May 23, 2019 and which claims priority to German Patent Application No. 10 2018 006 139.7, which was filed in Germany on Aug. 3, 2018 and which are both herein incorporated by reference.

BACKGROUND OF THE INVENTION

Field of the Invention

The present invention relates to a 1D ultrasonic transducer unit for material detection, having at least three discrete and individually controllable ultrasonic transducers for detecting objects, contours, or distances.

Description of the Background Art

Ultrasound or ultrasonic transducers are used in a wide variety of measurement arrangements. Depending on the application, the ultrasound is decoupled in a liquid or gaseous medium.

An ultrasonic converter array for use in gaseous media is known from WO 2008/135 004 A1. The array has a layer structure made of a layer of an electret between two electrode structures, wherein the one electrode structure comprises a plurality of independently addressable electrode elements, by means of which local thickness vibrations of the electret layer are generated.

A 1.5D array of ultrasonic transducers with an improved near-surface resolution is known from US 2013/0283918 A1. Phase-controlled ultrasonic transducer arrays and adaptive or compensating control methods are described in US 2014/0283611 A1 and U.S. Pat. No. 6,310,831 B1.

Further ultrasonic transducers are known from EP 0 940 801 A2 and from "Phased array transducer for emitting 40 kHz air-coupled ultrasound without grating lobes," Eric Konetzke et al., IEEE International Ultrasonic Symposium, 2015, pp. 1-4 and from "Air-coupled 40-kHz ultrasonic 2D-phased array based on a 3D-printed waveguide structure," Jager et al., IEEE International Ultrasonic Symposium, 2017, pp. 1-4, and from Takahashi et al., "Ultrasonic phased array sensor for electrical travel aids for visually impaired people," Proceedings of SPIE (The International Society for Optical Engineering SPIE), Vertical-cavity Surface-emitting Lasers XIII, Vol. 6794, Dec. 3, 2007, Page 67943V, ISSN: 0277-786X, and from "Murata Manufacturing Co.: Ultrasonic Sensor Application Manual Cat. No. S15E-5, Jan. 1, 2009," URL:https://cdn-reichelt.de/documents/datenblatt/B400/ultraschall%20sensor.pdf, page 3.

For use in an industrial environment, the ultrasonic transducers used must be able to guarantee a temperature stability of the measurement from −40° C. to in part over 100° C. and an electromagnetic compatibility with other technical devices. In addition, the ultrasonic transducers must be robust against harsh environmental influences, such as, e.g., dust, moisture, aggressive chemicals, as well as against mechanical impacts or against mechanical scratching.

To achieve high detection ranges, piezoelectric ceramics, such as, e.g., lead zirconate titanate (PZT), are used, which have high coupling factors compared with other piezoelectric materials such as quartz, electrets, or PVFD. The coupling factor in this regard is a measure of the conversion efficiency between mechanically and electrically stored energy. For PZT, depending on the excitation direction, these are, for example, in the range from 0.3 to approximately 0.75.

Depending on the direction of polarization of the piezoelectric material, resonant mechanical vibrations can be generated with the aid of alternating voltages in the piezoelectric body; these are referred to as planar, thickness, or shear vibrations, depending on their geometric propagation. Typical dimensions of the piezoelectric body, which are necessary for a resonant vibration at a given frequency, can be estimated from the material-specific frequency constants for these vibration forms. These frequency constants for PZT are typically between 1300 kHz*mm to 2600 kHz*mm, depending on the type of vibration.

A thin disk made of PZT suitable for the sensor technology accordingly has a diameter of approximately 4 mm to 100 mm for excitation frequencies of 20 kHz to 500 kHz in the planar mode. Due to the capacitive properties of such a thin disk, low excitation voltages can be easily realized with an appropriate polarization.

Greater piezo disk thicknesses are not worthwhile. On the one hand, with an increasing thickness of the piezoelectric material, higher voltages, rapidly in the kV range as well, must be applied for the same frequency range, which means a greater safety effort. On the other hand, the rigidity of the piezoelectric body also changes with its thickness, which has direct effects on the reception of sound waves.

When a number of ultrasonic transducers are used in a phase-controlled, at least one-dimensional array (phased array), it must be noted further that the distances between adjacent ultrasonic transducers must not be greater than the wavelength of the ultrasonic wave or preferably not greater than half the wavelength.

The overall size of the individual transducers or the frequency ranges possible with a certain design/size of the ultrasonic transducers are accordingly limited by these distance condition.

For example, a maximum distance between adjacent transducers in the order of magnitude of approximately 8.5 mm to approximately 0.3 mm results for a frequency range between 20 kHz and 500 kHz and decoupling in air.

The previously described transducer with a thin disk made of PZT, suitable for sensor technology, however, has a diameter that is more than 10 times larger on average due to the piezo disk diameter.

SUMMARY OF THE INVENTION

It is therefore an object of the present invention to provide a device that advances the state of the art.

The object is achieved by a 1D ultrasonic transducer unit for hazard identification for material detection.

According to an exemplary embodiment of the invention, a 1D ultrasonic transducer unit for area monitoring is provided, comprising a housing, at least three ultrasonic transducers, and a control unit, wherein the control unit is designed to control each ultrasonic transducer individually, the housing has a securing device for securing to a surface, the control unit is at least partially disposed in the housing, the housing has a communication interface, each ultrasonic transducer has a transducer housing, a piezoelectric body disposed in the transducer housing, and a sound decoupling layer, disposed at an open end of the transducer housing, for decoupling in a gaseous medium and is disposed at a fixed position in the housing, each ultrasonic transducer is designed to emit and/or receive a sound wave with a consistent working frequency, and the working frequency of the sound waves is in a range from 20 kHz to 400 kHz.

In each case, two ultrasonic transducers, directly adjacent to one another, in the housing are spaced apart by a distance of at most 10 cm or at most 5 cm or at most 2 cm from the center of the sound decoupling layer to the center of the sound decoupling layer. The 1D ultrasonic transducer unit has one sound channel per ultrasonic transducer, wherein each sound channel has an input opening and an output opening, exactly one of the input openings is associated with each sound decoupling layer, the output openings are arranged along a straight line, the output openings are each arranged in a wall of the housing, or the sound channels penetrate the wall of the housing. A distance from the center of one of the output openings to the center of a directly adjacent output opening corresponds at most to the wavelength in the gaseous medium or at most to half the wavelength in the gaseous medium, wherein the distance between two directly adjacent output openings is in each case smaller than the distance between the ultrasonic transducers associated with the corresponding input openings, a quotient of a surface area of the output opening to a surface area of the input opening has a value between 0.30 and 1.2, and each sound channel has at least a length corresponding to the diameter of the input opening.

It is understood that the ultrasonic transducers of the 1D ultrasonic transducer unit are individual discrete components, wherein each ultrasonic transducer is disposed in the housing and connected to the housing and thus has fixed distances from all further ultrasonic transducers. In this case, two ultrasonic transducers, arranged next to one another and between which no further ultrasonic transducer is arranged, are directly adjacent to one another.

It is understood that the individual sound channels are formed tubular or rod-shaped, wherein, for example, the tube diameter is reduced and/or the shape of the cross-sectional area changes and/or the course of the channel is formed curved. The sound channels advantageously have no edge over their entire length from the sound decoupling layer to their output opening.

The sound channels lead the sound waves generated by the individual ultrasonic transducers out of the housing or the reflected sound waves back to the ultrasonic transducers. A wave front is created in this way at the output openings on the housing wall or outside the housing by superposition.

With the multiple, individually controllable ultrasonic transducers, wave fronts with an adjustable main propagation direction can be generated by time-shifted or phase-shifted control. This makes it possible to detect a larger measurement area at least in one dimension with just one 1D ultrasonic transducer unit. Moreover, additionally the structure of the surface of an object and/or the shape of an object can be detected. Thus, for example, the type of object can be determined.

By arranging sound channels in front of the individual ultrasonic transducers, the individual sound sources are relocated to the respective ends or the output openings of the sound channels in the case of superposition or for superposition to form a common wave front. This makes it possible to set the distances between the individual sound sources independently of the size, e.g., the diameter, of the individual ultrasonic transducers or independently of the distances between the individual ultrasonic transducers. In particular, it is possible to reduce the distances between the sound sources in comparison with the distances between the individual transducers.

With a housing diameter of the individual ultrasonic transducers of 7 mm, for example, the distance between two transducers is at least 14 mm. Accordingly, without a sound channel, only wave fronts with frequencies up to at most 22 kHz ($\lambda \geq 14$ mm) or up to at most 11 kHz ($\lambda/2 \geq 14$ mm) can be realized. The generation of wave fronts with higher frequencies, therefore, smaller wavelengths, is possible with the same ultrasonic transducers only with the aid of the sound channels of the invention, because the distance between the individual "sound sources" during the superposition is not determined by the size of the transducer housing, but only by the size and distance of the sound channel output openings.

The sound channels also ensure a precise, directional detection.

The radiating aperture of a piezoelectric transducer, e.g., a circular aperture with a diameter predetermined by the piezoelectric body, is changed by means of the sound channels, so that they satisfy the conditions of a desired array arrangement in at least one dimension. This enables the use of robust, reliable, and/or inexpensive discrete ultrasonic transducers in a phased-array arrangement. The phased-array arrangement enables a large viewing angle with just a single 1D ultrasonic transducer unit and thereby reliable monitoring of fill levels, for example. It is also possible to recognize surface structures and/or objects or object shapes.

It is not necessary to use particularly small, for example, integrated ultrasonic transducers such as MEMS. Similarly, there is little need to attach, read out, and optionally coordinate multiple transducer units.

The housing can have a movable cover device, wherein the cover device is designed to close the output openings of all sound channels. As long as the 1D ultrasonic transducer unit is not in use, the sound channels can be closed by means of the cover device by which means the entry of foreign bodies/contaminants can be prevented. To open and close the sound channels or to move the cover device, the 1D ultrasonic transducer unit comprises, for example, an adjuster.

The quotient between the surface area of the second cross-sectional area and the surface area of the first cross-sectional area can have a value between 0.5 and 1.5 or between 0.9 and 1.1. According to the invention, the surface area of the input area can be enlarged, reduced, or retained, wherein simultaneously a reduction of at least the width of the output opening in comparison to the input opening is achieved.

Each sound channel can have a length from the sound decoupling layer of each ultrasonic transducer to the output opening of the associated sound channel, wherein the length is an integral multiple of one eighth of the wavelength of the sound frequency or an integral multiple of half the wavelength of the sound frequency.

The output openings of all sound channels can lie in a common flat plane or in a curved surface. Focused wave fronts can be generated, for example, by arrangement in a curved surface, e.g., a concave surface.

Each sound channel can be formed of a metal or a plastic. Alternatively, each sound channel comprises a metal or a plastic.

Each ultrasonic transducer can have a sound uncoupling layer between the sound decoupling layer and the transducer housing.

The control unit can be disposed completely or partially in the housing.

The housing of the 1D ultrasonic transducer unit can be designed at least according to the IP 40 protection class.

The housing can have at least one signal interface for transmitting a measurement signal and/or a control signal. The signal output is designed, for example, as a communication interface in order to communicate with an external control unit by means of a bus system or protocol. Likewise, the signal interface can also provide wireless data transmission, for example, using Bluetooth.

Each ultrasonic transducer can protrude with the sound decoupling layer in front into the associated input opening, wherein in a refinement, each sound channel precisely accommodates at least one part of the associated ultrasonic transducer. Stated differently, according to this embodiment, an inner shape of the sound channels in the area of the input opening corresponds as precisely as possible to an outer shape of the respective ultrasonic transducer.

The housing of each ultrasonic transducer can have a diameter of at least 7 mm. The housing of each ultrasonic transducer is designed, for example, as a cylindrical metal cup. According to a refinement of this embodiment, a surface of the sound decoupling layer, an edge of the metal cup, and, for example, a sound uncoupling layer, arranged therebetween, of each individual ultrasonic transducer each span a flat plane.

Each ultrasonic transducer can have electromagnetic shielding which is at a reference potential. It is understood that the electromagnetic shielding can also be formed completely or at least partially by the housing, in particular by a metal cup serving as the housing. Alternatively, the 1D ultrasonic transducer unit can also have a common shielding for all ultrasonic transducers, e.g., a common housing.

Each sound channel can have a wall thickness of at least 0.5 mm or at least 1 mm. According to another refinement, two sound channels each have a distance of at least 0.5 mm or at least 1 mm from one another over the entire length of the two sound channels.

The housing can comprise a planar rear wall and a front wall running parallel to the rear wall. This enables the 1D ultrasonic transducer unit to be attached to and aligned on a surface in a particularly simple and reliable manner. The ultrasonic transducers are preferably attached to the rear wall and the sound channels preferably end at or in the front wall. Particularly preferably, not only the output openings of the sound channels, but also the ultrasonic transducers and the input openings of the sound channels are arranged along a straight line. The straight line spanned by the inputs to the sound channels is, for example, significantly longer than the straight line spanned by the output openings.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
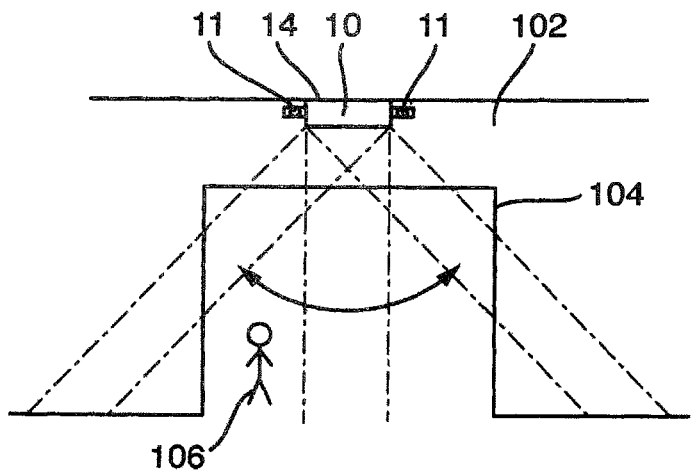
FIG. 1A is a view of an embodiment of the invention of a 1D ultrasonic transducer unit for area monitoring.

The illustration in FIG. 1A shows a view of a first embodiment of a 1D ultrasonic transducer unit 10 of the invention for area monitoring. The 1D ultrasonic transducer unit has a housing 14 which is attached with a securing device 11 to a wall 102 above a passageway 104. Sound waves 11 are generated by 1D ultrasonic transducer unit 10. Sound waves 11 have a main direction of propagation, wherein the main direction of propagation in the image plane can be pivoted (dashed line, dotted line, or dot-dashed line), as a result of which the entire area of the passageway 104 can be reliably monitored. Objects 106, e.g., people and/or a floor and/or a side wall of passageway 104, reflect sound waves 11. The entire area of passageway 104 can be reliably checked by means of 1D ultrasonic transducer unit 10. Objects 106 passing through passageway 104 can optionally be recognized by their shape.

Figure 1B:
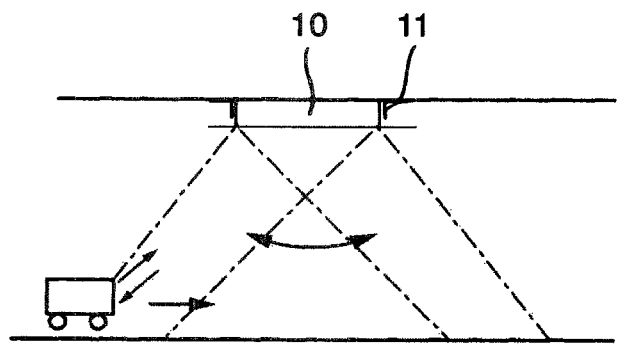
FIG. 1B is a view of an embodiment of the invention of a 1D ultrasonic transducer unit for area monitoring.

A second embodiment of the invention of 1D ultrasonic transducer unit 10 is shown in the illustration of FIG. 1B. 1D ultrasonic transducer unit 10 is attached above with a securing device 11 to a building ceiling 106, so that objects 110 within the detection area, expanded by the pivoting, of unit 10 can be detected by means of the ultrasonic waves. The shape or the surface structure of objects 110 can also be determined by means of unit 10.

Figure 2:
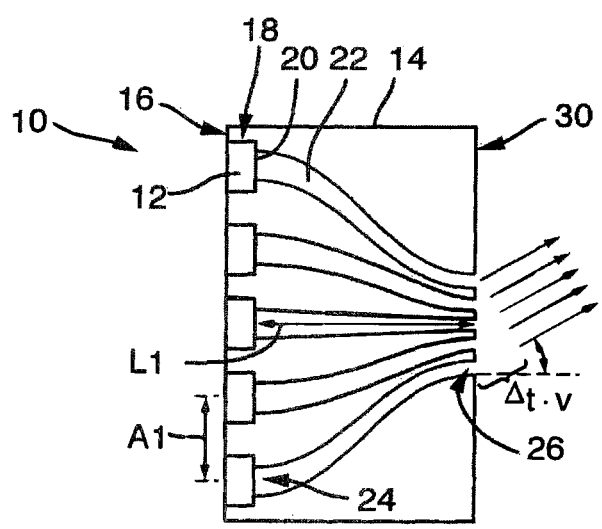
FIG. 2 is a sectional view of an embodiment of the invention of a housing of a 1D ultrasonic transducer unit.

A sectional view of a housing 14 of an ultrasonic transducer unit 10 is shown in the illustration of FIG. 2. In housing 14, five discrete ultrasonic transducers 12 are arranged along a planar rear wall 16 of housing 14. Each ultrasonic transducer 12 has its own transducer housing 18 and a sound decoupling layer 20. Each ultrasonic transducer 12 is spaced apart by a distance A1 from the directly adjacent ultrasonic transducer(s) 12 from the center of sound decoupling layer 20 to the center of sound decoupling layer 20.

A sound channel 22 is associated with each ultrasonic transducer 12, wherein each sound channel 22 has an input opening 24 and an output opening 26. Input openings 24 are each arranged in front of or around one of ultrasonic transducers 12, so that the respective ultrasonic transducer 12 emits into sound channel 22. Output openings 26 of sound channels 22 are arranged along a planar front wall 30 of housing 14, said front wall being opposite the rear wall, or penetrate front wall 30.

In each case two adjacent output openings 26 are spaced apart by a distance A2 from the center of output opening 26 to the center of output opening 26. According to the invention, the distance A2 between output openings 26 is in each case less than or equal to the distance A1 of the assigned or associated ultrasonic transducer 12.

A length L1 from each sound decoupling layer 20 to output opening 26 of the associated sound channel 22 is an integral multiple of one eighth of the wavelength of the sound frequency.

A control unit (not shown) is designed to control each ultrasonic transducer 12 individually. By controlling the individual ultrasonic transducers 12 in a time-shifted or phase-shifted manner, 1D ultrasonic transducer unit 10 generates planar ultrasonic waves with a main direction of propagation (arrows), wherein the main direction of propagation can be set by means of the phase offset between the sound waves emerging from output openings 26 of the individual sound channels.

Figure 3:
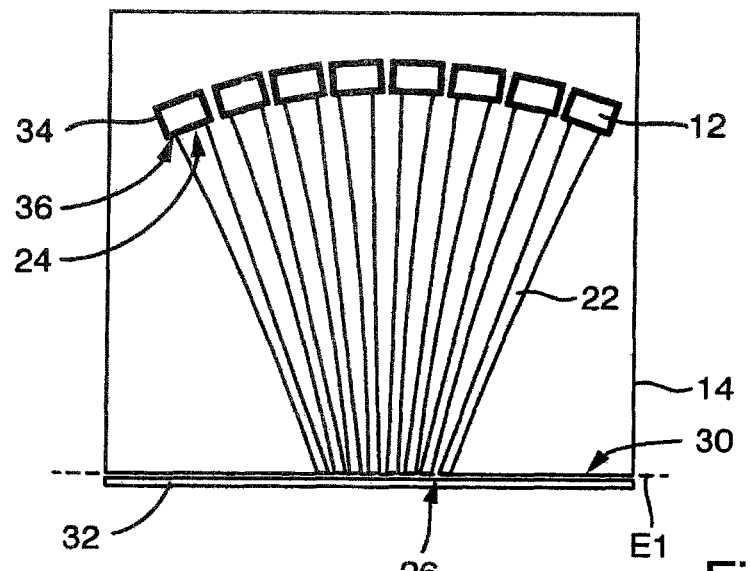
FIG. 3 is a view of a further embodiment of the invention of the sound channels.

In the exemplary embodiment shown in FIG. 3, sound channels 22 run so that output openings 26 of all sound channels 22 lie in a common flat plane E1. In the illustrated embodiment, front wall 30 of housing 14 of 1D ultrasonic transducer unit 10 runs within plane E1. A region 34 of the respective sound channel 22, said region also located in front of input opening 24 of each sound channel 22, is designed so that the respectively associated ultrasonic transducer 12 fits precisely into sound channel 22. For this purpose, each sound channel 22 in the region has an inner diameter corresponding to outer diameter D1 and an edge 36 serving as a stop.

Housing 14 also comprises a movable cover device 32. Cover device 32 is in a closed state in the illustrated exemplary embodiment. For this purpose, the cover device is arranged in front of front wall 30 of housing 14 with output openings 26, so that sound channels 22 are closed. In an open state, cover device 32 is no longer located in front of front housing wall 30 and output openings 26, for example, by folding or sliding, and output openings 26 are uncovered.

Figure 4:
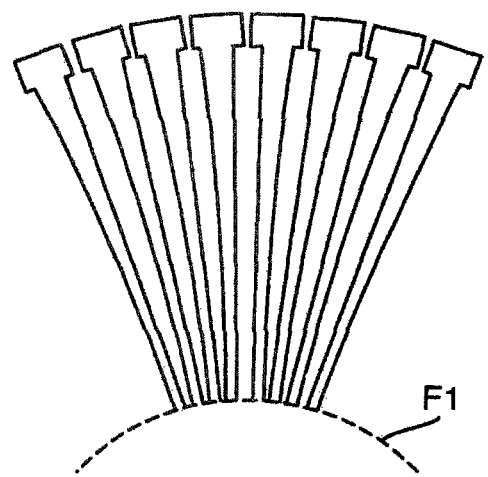
FIG. 4 is a view of a further embodiment of the invention of the sound channels.

In the exemplary embodiment shown in FIG. 4, output openings 40 of all sound channels 36 lie in a concavely curved surface F1.

Figure 5:
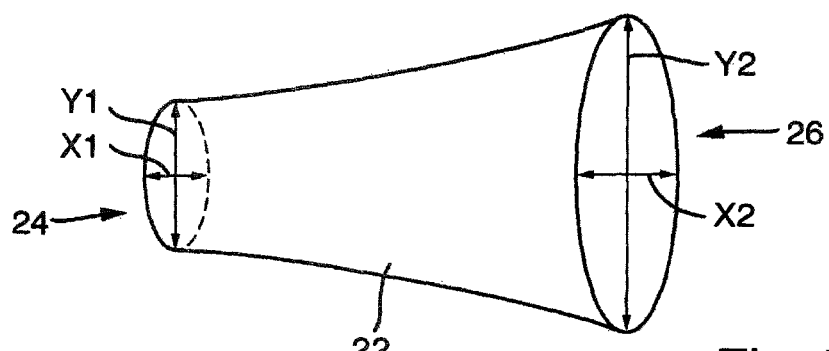
FIG. 5 is a view of a further embodiment of an individual sound channel.

An individual sound channel 22 is shown schematically in the illustration in FIG. 5, the differences from FIGS. 1 to 4 being explained below.

Input opening 24 has a cross-sectional area with a width x1 and a height y1, and output opening 26 has a cross-sectional area with a width x2 and a height y2.

Input opening 24 is formed circular; i.e., the width x1 and height y1 of the cross-sectional area have the same value. Output opening 26, in contrast, has an oval shape, so that the width x2 of the cross-sectional area is smaller than the width y2.

The width x2 of output opening 26 is preferably smaller than the width x1 of input opening 24. In contrast, the height y2 of output opening 26 is preferably greater than the height y1 of input opening 24. The increase in the height of sound channel 22 particularly preferably compensates for the decrease in the width of sound channel 22, so that the surface area of the cross-sectional area of input opening 24 corresponds to the surface area of the cross-sectional area of output opening 26.

It is understood that the width x2 of each output opening 26 must be smaller than the wavelength of the sound frequency in order to be able to realize a distance of at most the wavelength of the sound frequency from the center of output openings 26 to the center of a directly adjacent output opening 26.

Figure 6:
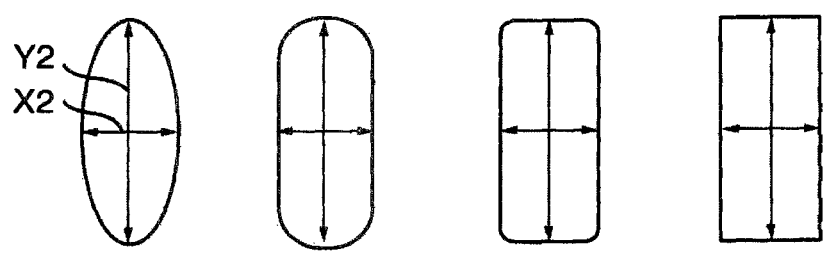
FIG. 6 is a schematic view of various embodiments of an output surface of a sound channel.

In the illustration in FIG. 6, a number of exemplary embodiments of the invention of the cross-sectional areas of output openings 26 are shown schematically. So that the surface area of the cross-sectional area of output opening 26 corresponds to the surface area of the cross-sectional area of input opening 24, shapes are particularly suitable that have a ratio of width x2 to height y2 of approximately 1.5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A 1D ultrasonic transducer unit for area monitoring, the transducer unit comprising:
a housing;
at least three ultrasonic transducers; and
a control unit to control each ultrasonic transducer individually,
wherein the housing has a communication interface,
wherein each ultrasonic transducer has a transducer housing, a piezoelectric body disposed in the transducer housing, and a sound decoupling layer disposed at an open end of the transducer housing for decoupling in a gaseous medium, and is disposed at a fixed position in the housing,
wherein each ultrasonic transducer is designed to emit and/or to receive a sound wave with a consistent working frequency,
wherein the working frequency of the sound waves is in a range from 20 kHz to 400 kHz,
wherein in each case, two ultrasonic transducers, directly adjacent to one another, in the housing are spaced apart by a distance of at most 10 cm from a center of the sound decoupling layer of one of the two ultrasonic transducers to a center of the sound decoupling layer of other one of the two ultrasonic transducers,
wherein the 1D ultrasonic transducer unit has one sound channel per ultrasonic transducer,
wherein each sound channel has an input opening and an output opening,
wherein exactly one of the input openings is associated with each sound decoupling layer,
wherein the output openings are each arranged in a wall of the housing, or the sound channels penetrate the wall of the housing,
wherein a distance from a center of one of the output openings to a center of a directly adjacent output opening corresponds at most to a predetermined wavelength based on the working frequency in the gaseous medium,
wherein a distance between two directly adjacent output openings is in each case smaller than a distance between the ultrasonic transducers associated with the corresponding input openings,
wherein a quotient of a surface area of the output opening to a surface area of the corresponding input opening has a value between 0.9 and 1.1,
wherein the output openings of the sound channels are arranged along a first direction,
wherein each of the output openings has an output width along the first direction and an output height along a second direction perpendicular to the first direction,
wherein a ratio of the output height to the output width is 1.5,
wherein each sound channel has at least a length corresponding to a diameter of the input opening,
wherein the housing has a securing device for securing to another device, wherein the control unit is at least partially disposed in the housing, wherein the housing has a movable cover device configured to close the output openings of all sound channels when the 1D ultrasonic transducer unit is not in use, and wherein the output openings of all sound channels lie in a curved surface.

2. The 1D ultrasonic transducer unit according to claim 1, wherein each sound channel has the length from the sound decoupling layer of each ultrasonic transducer to the output opening of the associated sound channel and the length is an integral multiple of one eighth of the predetermined wavelength or an integral multiple of half the predetermined wavelength.

3. The 1D ultrasonic transducer unit according to claim 1, wherein each sound channel consists of a metal or a plastic or comprises a metal or a plastic.

4. The 1D ultrasonic transducer unit according to claim 1, wherein each ultrasonic transducer has a sound uncoupling layer between the sound decoupling layer and the transducer housing.

5. The 1D ultrasonic transducer unit according to claim 1, wherein the control unit is disposed completely in the housing.

6. The 1D ultrasonic transducer unit according to claim 1, wherein the housing of the 1D ultrasonic transducer unit is designed at least according to an IP 40 protection class.

7. The 1D ultrasonic transducer unit according to claim 1, wherein the communication interface is designed for wireless data transmission.

8. The 1D ultrasonic transducer unit according to claim 1, further comprising an adjuster configured to open and close the sound channels or to move the cover device.

9. The 1D ultrasonic transducer unit according to claim 1, wherein each ultrasonic transducer has a corresponding electromagnetic shielding.

10. The 1D ultrasonic transducer unit according to claim 9, wherein each ultrasonic transducer has the corresponding electromagnetic shielding that is formed completely or at least partially by the housing.

11. The 1D ultrasonic transducer unit according to claim 10, wherein the housing comprises a metal cup.

12. The 1D ultrasonic transducer unit according to claim 1, wherein the at least three ultrasonic transducers have a common electromagnetic shielding.

13. The 1 D ultrasonic transducer unit according to claim 1, wherein each of the input openings has an input width along the first direction and an input height along the second direction, the output width is smaller than the input width, and the output height is greater than the input height.

14. The 1D ultrasonic transducer unit according to claim 1, wherein the surface area of the output opening to the surface area of the corresponding input opening remains the same.

* * * * *